United States Patent [19]

Janky et al.

[11] Patent Number: 5,794,174
[45] Date of Patent: Aug. 11, 1998

[54] SYSTEM FOR AUTOMATIC VEHICLE LOCATION VIEWING VIA TELEVISION

[75] Inventors: James M. Janky, Los Altos; James C. Reynolds, San Jose, both of Calif.

[73] Assignee: Trimble Navigation Limited, Sunnyvale, Calif.

[21] Appl. No.: 616,085

[22] Filed: Mar. 15, 1996

Related U.S. Application Data

[63] Continuation-in-part of Ser. No. 544,556, Oct. 18, 1995.

[51] Int. Cl.⁶ .............................. G08G 1/123; G01S 3/02
[52] U.S. Cl. .................... 701/207; 701/213; 701/219; 340/989; 348/7
[58] Field of Search ............................ 701/207, 213, 701/219, 300; 340/990, 993; 342/357, 457; 348/7, 8

[56] References Cited

U.S. PATENT DOCUMENTS

| | | | |
|---|---|---|---|
| 4,071,895 | 1/1978 | Wood et al. | 364/449 |
| 4,700,378 | 10/1987 | Brown | 379/96 |
| 5,155,689 | 10/1992 | Wortham | 364/460 |
| 5,173,710 | 12/1992 | Kelley et al. | 342/463 |
| 5,247,347 | 9/1993 | Litteral et al. | 358/85 |
| 5,280,295 | 1/1994 | Kelley et al. | 342/463 |
| 5,396,540 | 3/1995 | Gooch | 379/59 |
| 5,477,228 | 12/1995 | Tiwari et al. | 342/357 |
| 5,493,638 | 2/1996 | Hooper et al. | 395/135 |
| 5,493,694 | 2/1996 | Vlcek et al. | 455/53.1 |
| 5,508,736 | 4/1996 | Cooper | 348/144 |
| 5,521,963 | 5/1996 | Shrader et al. | 379/60 |
| 5,537,102 | 7/1996 | Pinnow | 340/825.3 |
| 5,541,638 | 7/1996 | Story | 348/7 |
| 5,706,334 | 1/1998 | Balk et al. | 379/67 |

*Primary Examiner*—Michael Zanelli
*Attorney, Agent, or Firm*—Wagner, Murabito & Hao

[57] ABSTRACT

A system for visually representing the location of an item on a television. In one embodiment, a user of the present system telephonically requests that a visual representation of the location of an item be transmitted from a telephone company and displayed on the user's television. In the present embodiment, the user's television is connected with the telephone company by a telephone line and a modem. Once the request is received at the telephone company, position information indicative of the location of the item is transmitted from the item to a receiver. The position information is then transmitted from the receiver to the telephone company. The acquired position information is then transmitted from the telephone company to the user's television. A visual representation of the position of the item is then displayed on the user's television.

18 Claims, 4 Drawing Sheets

SYSTEM FOR AUTOMATIC VEHICLE LOCATION VIEWING VIA TELEVISION

This Application is a Continuation-in-Part of U.S. Pat. application Ser. No. 08/544,556 to Reynolds entitled "SYSTEM FOR AUTOMATIC VEHICLE LOCATION VIA CABLE TV" filed Oct. 18, 1995.

TECHNICAL FIELD

This invention relates to reporting the position of an item. Specifically, the present invention relates to displaying a visual representation of the location of the item on a television.

BACKGROUND ART

Prior art position reporting or tracking systems typically require a user to purchase numerous components. Such components include, for example, processors for deciphering position information of the tracked object, control panels for manipulating the system, display units for displaying the received position information, and the like. Such equipment is designed, built and sold by Trimble Navigation, Ltd. of Sunnyvale, Calif. under the general description of automatic vehicle location (AVL) systems. In addition to acquiring the numerous components, prior art systems also require that the user learns to operate the complex systems. Such a requirement, mastering the use of complex prior art systems, is a difficult and time-consuming task for the average consumer and is a definite impediment to widespread adoption of tracking systems.

Much of the difficulty associated with mastering prior art position reporting or tracking systems stems from the complexity of the systems, and the user's lack of familiarity with the required components. That is, many of the components, along with the operating parameters of the components, are new to the average consumer. The components also present a considerable expense barrier for many consumers.

Furthermore, many of the prior art position reporting or tracking systems require the user to purchase or "download" a separate GIS database for use in conjunction with the system. The GIS database contains, for example, map information used when generating a display showing the location of the object being tracked. In addition to being expensive, a GIS database requires extensive memory. A GIS database is often limited to a specific geographic area. Therefore, many prior art reporting or tracking systems require the user to download or purchase several GIS databases to ensure coverage throughout a desired geographic area. Also, in order to remain accurate, each GIS database must be periodically updated or changed to keep the GIS database information current.

Thus, a need exists for a reporting or tracking system which reduces the number of costly components required to be purchased, a system which does not require the user to master complex and unfamiliar components, and a system which does not require a user to purchase and update at least one GIS database.

DISCLOSURE OF THE INVENTION

It is therefore an object of the present invention to provide a reporting or tracking system which reduces the number of costly components required to be purchased, a system which does not require the user to master complex and unfamiliar components, and a system which does not require a user to purchase and update at least one GIS database. The above object has been achieved by a system which visually represents the location of a selected item on a television.

In one embodiment of the invention, a user of the present system telephones a telephone company to request that a visual representation of the location of a selected item be transmitted from the telephone company to the user's television. The visual representation of the location of the selected item is subsequently displayed on the user's television. In the present embodiment, the telephone company is communicatively coupled to the selected item. Pacific Bell or any other telephone company is an example of the type of telephone company utilized in the present embodiment. The selected item, in turn, has a position determining system coupled thereto. Position information indicative of the location of the item is generated by the position determining system. When desired, the position information is transmitted from the item to a receiver. The position information is then transmitted from the receiver to the telephone company. In response to the user's request, the acquired position information is then transmitted from the telephone company to the user's television. A visual representation of the position of the item is then displayed on the user's television. Furthermore, in one embodiment, the position information displayed on the user's television is comprised of two parts. The first part of the displayed map information consists of a displayed map of the general area in which the item is currently located. The second portion of the position information consists of an icon representing the item. Video overlay techniques are used to overlay the icon on top of the appropriate portion of the underlying displayed map. In so doing, the present invention displays on the user's television, a map and an overlying icon representing the item's location on the map.

Thus, a user of the present invention employs devices which are readily available and which are familiar to the user. That is, the present invention only requires a user to operate a telephone and a television. As most consumers own and are familiar with both a telephone and a television, the present invention eliminates much of the confusion and complexity associated with prior art reporting or tracking systems. Likewise, the present invention does not require the user to purchase or master the use of expensive and complex components associated with prior art reporting or tracking systems. As an additional advantage, in the present invention GIS databases are communicatively coupled to the telephone company. As a result, the present invention does not require a user to purchase or update any GIS databases.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
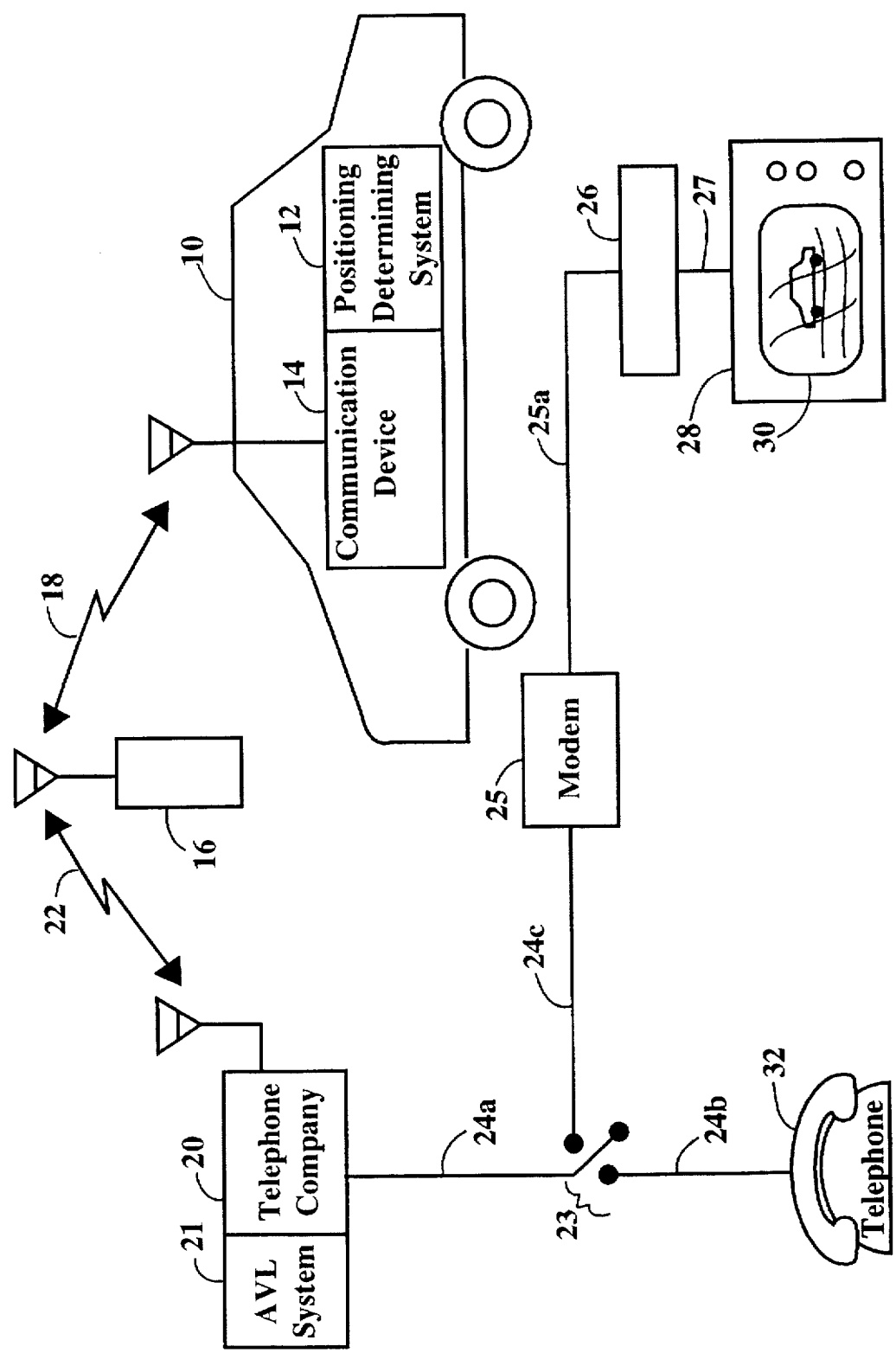
FIG. 1 is a schematic diagram of one embodiment of a position tracking and reporting system in accordance with the present claimed invention.

With reference now to FIG. 1, a schematic diagram of one embodiment of the present invention is shown. The following description of the present invention will begin with a detailed description of the physical characteristics of the present invention. This description will then be followed by a detailed description setting forth the operation of the present invention. Regarding the physical characteristics of the present embodiment, a vehicle 10 has position determining system 12 attached thereto. With reference to the embodiment of FIG. 1, position determining system 12 is shown attached to a personal vehicle. However, the present invention is also well suited to being attached to a commercial vehicle, to human beings, to pets, or to any desired object. A communication device 14 is coupled to position determining system 12. Position determining system 12 generates position information indicating, for example, the latitude, longitude, altitude, and velocity of tracking unit 10. Position determining system 14 also accurately determines the time at which vehicle 10 is at a specific location. In the present invention, position determining system 14 is, for example, a satellite-based radio navigation system such as the Global Positioning System (GPS), or the Global Orbiting Navigational System (GLONASS). Although such systems are specifically mentioned in the present embodiment, the present invention is also well suited to land-based radio navigation systems such as, for example, LORAN, FM subcarrier based systems, and the like. FM subcarrier positioning techniques are described, for example, in U.S. Pat. Nos. 5,173,710 and 5,280,295 to Kelley et al., both entitled "Navigation and Positioning System and Method Using Uncoordinated Beacon Signals" filed Aug. 15, 1991, and Dec. 22, 1992, respectively. U.S. Pat. Nos. 5,173,710 and 5,280,295 are incorporated herein by reference as background material. Additionally, the present invention is also well suited to recording GPS ephemeris data. Likewise the present invention is also well suited to recording position information which has undergone differential corrections to provide more accurate position information. Such differential correction systems are described in detail in U.S. Pat. No. 5,477,228 to Tiwari et al. entitled "Differential Global Positioning System Using Radio Data System" filed Apr. 13, 1993. U.S. Pat. No. 5,477,228 is incorporated herein by reference as background material.

Position determining system 12 is also able to generate velocity information when vehicle 10 is moving. Velocity information is obtained by measuring the Doppler shift of signals between an antenna of position determining system 10 and at least one radio navigation signal transmitter such as, for example, one of the GPS satellites, not shown. Additionally, position determining system 12 very accurately determines the time at which vehicle 10 is at any specific location.

As shown in FIG. 1, communication device 14 is communicatively coupled to a receiver 16 via communication link 18. Likewise, receiver 16 is coupled to a service provider 20 via communication link 22. Thus, in the present embodiment, receiver 16 is, for example, an intermediate transceiver for shortening the communication path between vehicle 10 and service provider 20. Although a receiver 16 is employed in the present embodiment, the present invention is also well suited to using multiple intermediate receivers. Additionally, the present invention is also well suited to having communication device 14 communicate directly with service provider 20. In the present embodiment, service provider 20 is a telephone company. Although such a service provider is utilized in the present embodiment, the present invention is also well suited to various other types of service providers. FIG. 1 also shows an automatic vehicle locating (AVL) system 21 integral with telephone company 20. Although AVL system 21 is integral with telephone company 20 in the present embodiment, the present invention is also well suited to having AVL system 21 located elsewhere and communicatively coupled to telephone system 20. AVL system 21 takes received position information (i.e. latitude, longitude, altitude, speed, and heading) and matches the position information with a portion of a map contained, for example, in a map database. The map portion is generally selected such that the position of item 10 is approximately centered on the selected map portion. AVL system 21 is also able to handle such factors as which map matches the location of item 10, what size of map is appropriate, what level of detail is needed, and the like. AVL system 21 also creates an x and y icon location on the selected map portion wherein the icon's location represents the position of item 10 with respect to the selected map portion.

In the present invention, communication links 18 and 22 are established through any of various techniques. For example, communication links 18 and 22 can be established using a Metricomm Wide Area Network (WAN) link operating at approximately 900 MHz. Communication links 18 and 22 can be established using a standard cellular telephone connection. Communication links 18 and 22 can also be established using a trunked radio system. In such a system for example, vehicle 10 first contacts "headquarters" or a communication base and is assigned a communication channel. Communication between vehicle 10, receiver 16, and telephone company 20 must take place over the assigned channel. Communication links 18 and 22 can also be established using a Cellular Digital Packet Data (CDPD) protocol. In the CDPD protocol, a modem and a radio are used to send data at a rate of 19.2 Kbits/s over cellular circuits not currently being used for voice transmissions. A control channel is called, for example, by vehicle 10, and vehicle 10 is assigned a channel. Vehicle 10 then bursts packet data, using, for example, TCP/IP protocol, to deliver the data to receiver 16 until the data is completely transmitted or until the channel is no longer free. If the data is not completely transferred when the channel expires, communication links 18 and 22 are then established using a different channel. As yet another example, communication links 18 and 22 can be established using a Subscription Mobile Radio (SMR) system wherein an assigned frequency is used for communication links 18 and 22. The present invention is also well suited to having rf-based communication links 18 and 22. The FCC has assigned new frequency bands in the 2 GHz range for use by the so-called Personal Communication Systems or networks; such services will no doubt be offered by telephone companies in the future, and represent yet an additional means for linking vehicles to respective service centers.

With reference still to FIG. 1, in the present embodiment, the link to the user's location (e.g. home, office, or other location) is established via a dial up telco line or a dedicated line. Telephone company 20 is coupled via telephone line 24a to switch 23. Telephone line link telephone 24b extends from switch 23 to telephone 32, while telephone line link 24c extends from switch 23 to modem 25. In the present embodiment, switch 23 is an off-the-shelf switch readily available to consumers. The present invention is also well suited to having a separate dedicated telephone line link to modem 25. The present invention is also well suited to using other types of telephone line links to couple modem 25 to telephone company 20. Modem 25 is coupled to television interface box 26 via line 25a. A television input line 27 extending from television interface box 26 is coupled to television 28. Television 28 includes a display screen 30.

In the present embodiment, telephone line links 24a, 24b, and 24c are conventional telephone lines. Although a conventional telephone line is used in the present embodiment, the present invention is also well suited to the use of for example, an ISDN line, a fiber optic line, dedicated line, or any other line over which data transmission can occur.

IN OPERATION

The following is a detailed description of the operation of the present invention. Once a user wishes to know the location of an item equipped with a position determining system, the user telephones the service provider using telephone 32. As shown in step 40 of FIG. 2, upon contacting the service provider, telephone company 20, the user requests that position information of vehicle 10 be displayed on display screen 30 of FIG. 1. With reference next to step 42 of FIG. 2, once the telephonic request for position information is received at telephone company 20, the automatic vehicle location system initiates a prompt to vehicle 10 to transmit the vehicle's position information to the service provider. The automatic vehicle location system coupled to telephone company 20 uses any of a number of communication links to reach the vehicle's position determining system. As shown in step 44, in the present embodiment, the position information is first transmitted from vehicle 10 to receiver 16 via communication link 18 both of FIG. 1. In step 46, the position information is received at receiver 16. Step 48 shows that the position information is then transmitted from receiver 16 to telephone company 20 via communication link 22 of FIG. 1. Although such a "query" and "response" protocol is used in the present embodiment, the present invention is also well suited to numerous other protocols for acquiring the position information of the vehicle or any desired object at a service provider.

Figure 2:
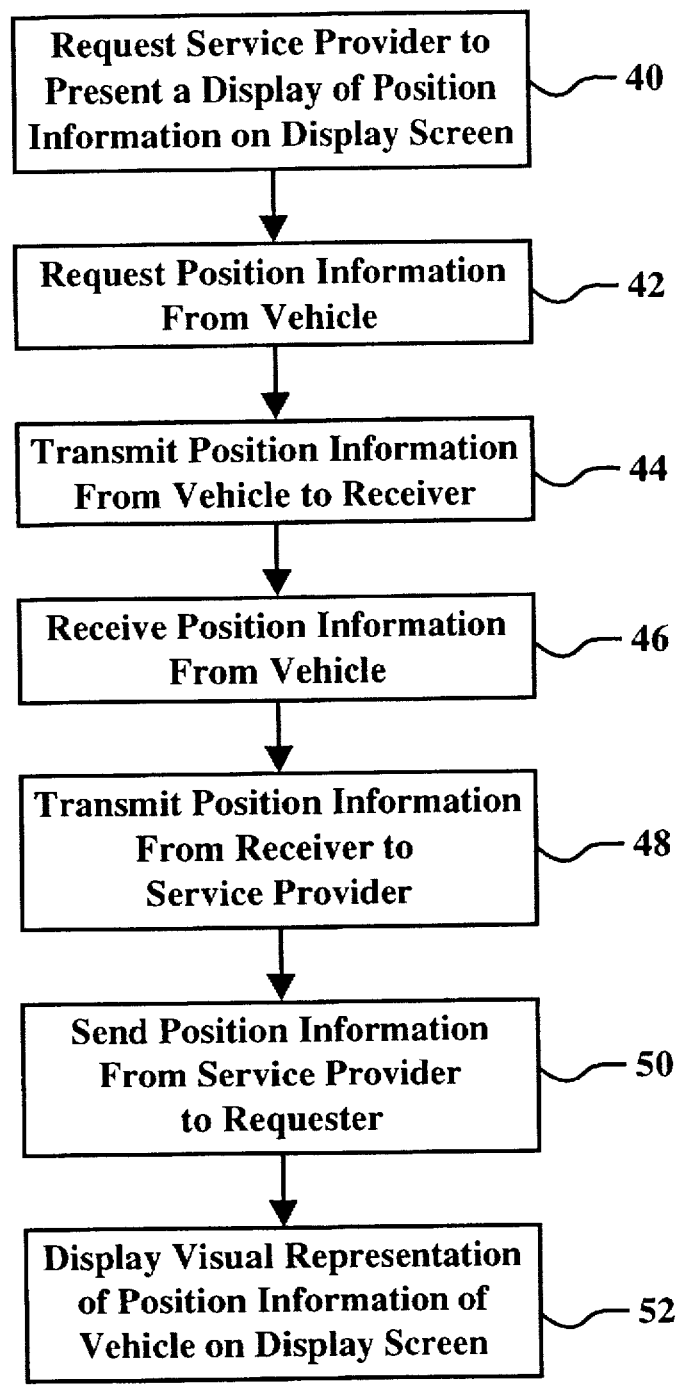
FIG. 2 is a block diagram showing steps used during operation of the present claimed invention.

With reference now to step 50 of FIG. 2, once the position information of the vehicle is acquired by telephone company 20, a visual representation of the position information is sent over telephone line link 24a to the requester. The visual representation is sent in data format over line 24a to the requestor. In the present embodiment, the requester must position switch 23 in a position such that the data information is sent over telephone line link 24b to modem 25. Although the requestor selects the position of switch 23 in the present embodiment, the present invention is also well suited to having the position of switch 23 selected automatically once the requester contacts the service provider. The present invention is also well suited to having the visual representation data sent to directly to modem 25 after the requestor contacts the service provider. In the present invention the transmission of the visual representation of the position information over telephone line links 24a, 24b, and 24c is accomplished using well known data transmission techniques. That is, transmission of the data is handled using a transmitter/modulator located in the head end or operations center of telephone company 20. The operations center takes the position information received from position determining system 12 and converts the information to a form compatible for transmission. Specifically, the operations center converts the information to a form compatible for transmission via, for example, a conventional telephone line (either dial up or dedicated), an ISDN line, a fiber optic line, or any other data transmission line. Only a single frame of video need be transmitted to represent the map, and so the data transmission speed is only of minor importance to satisfactory operation. Current modems operating at 28.8 Kbps take approximately 10–40 seconds to send the map display data and icon location. As line speed increases, service time will decrease.

As shown in FIG. 1, in the present embodiment, the visual representation of the position information is sent to television 28 using a standard telephone transmitting procedures. By using a standard telephone procedures, several substantial advantages are realized. In a conventional telephone system each telephone is uniquely addressable. Hence, each user of the present invention is uniquely identifiable by the service provider. Thus, each user can have selected position information relating only to that user's vehicle displayed on that user's television. As a result, the present invention allows multiple users to have different position information from respective multiple vehicles displayed on their respective televisions.

Figure 3:
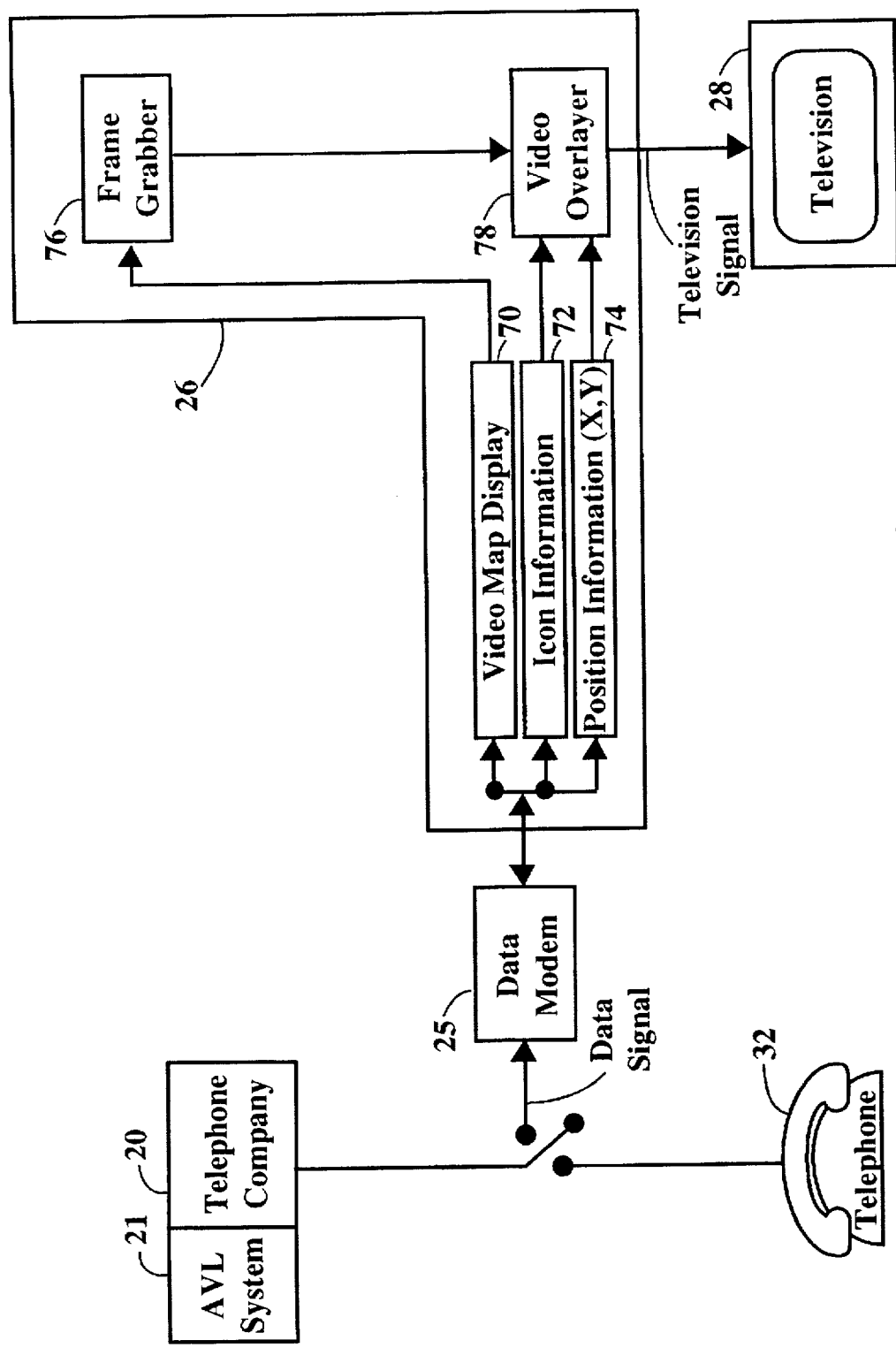
FIG. 3 is a block diagram illustrating features within a television interface box in accordance with the present claimed invention.

With reference now to FIG. 3, a schematic diagram is shown illustrating features contained within television interface box 26 employed in the present invention. As shown in FIG. 3, a visual representation of the position information in data signal format is sent to television interface box 26. The data signals are passed from modem 25 to television interface box 26. As shown in FIG. 3, in the present embodiment, television interface box 26 employs video map display logic 70 to instruct frame grabber 76 which frames are to be grabbed. Although frame grabber 76 is shown integral with television interface box 26 in the present embodiment, the present invention is also well suited to having frame grabber 76 disposed other than integral with television interface box 26. Additionally, the diagram of FIG. 3 is intended to be an example of the types of features contained within a cable television box. It will, however, be understood by those of ordinary skill in the art that cable television box 26 can contain numerous other components and features which have not been shown for purposes of clarity.

Referring still to FIG. 3, using icon information logic 72, television interface box 26 tells video overlayer 78 what type or shape of icon to place onto display 30 of television 28. Television interface box 26 uses position information (x, y) logic 74 to tell video overlayer 78 where to place the icon on display 30 of television 28.

With reference again to FIG. 1, in the present embodiment, the visual representation of the position information for the user's vehicle is displayed in a "map" format. That is, a map is transmitted to the user's television of the area in which the user's vehicle is currently located.

Although such a visual representation is used in the present embodiment, the present invention is also well suited to numerous other visual representation formats. Other visual representation formats include, but are not limited to, a numeric display of the vehicle's latitude, longitude, and altitude, a display of the vehicle's location with respect to a selected way point, a display of the vehicle's speed and heading, the street address at which the vehicle is located, and the like. As an additional advantage, the present invention eliminates the need for each user to purchase a GIS database. In the present embodiment, GIS databases are kept by the service provider. Therefore, users of the present invention have access to GIS databases without being required to purchase or download GIS information.

In the present embodiment, the position information displayed on the screen includes an icon or image representing the location of the vehicle with respect to the map information already displayed on the display screen. The icon or image is generated over the displayed map is accomplished using well known video overlay techniques employed by video overlayer 78 of FIG. 3. Such video overlay generation is achieved by video overlayer 78 using, for example, readily available integrated circuits such as the Motorola MC144144. Such circuits contain a phase lock loop that will frequency and phase lock to the timing contained within the television.

Hence, in the present invention, the position information displayed on the user's television is comprised of two parts. In the present embodiment, the first part of the displayed map information consists of a displayed map of the general area in which the vehicle is currently located. The second portion of the position information consists of an icon representing the vehicle. Video overlay techniques are used to overlay the icon on top of the appropriate portion of the underlying displayed map. In so doing, the present invention displays on the user's television, a map and an overlying icon representing the vehicle's location on the map.

The present invention is also well suited to repeatedly or continually displaying a visual representation of the position information for the user's vehicle. In such an embodiment, a "movie-like" visual representation of the position information of the vehicle is displayed on the user's television. Thus, the present invention is well suited, for example, to allowing a user to "monitor" the path or progress of a vehicle. Such an approach is especially useful in embodiments where telephone line links 24a, 24b, and 24c are high speed ISDN or fiber optic links. The present invention has numerous applications such as, for example, allowing a concerned parent to follow the path of a vehicle containing a child, monitoring delivery vehicles, tracking and locating a pet, and the like. Furthermore, because the present invention is displayed on a standard television, the visual representation can easily be recorded using standard VCR equipment. Hence, a record of the path traveled, for example, by a delivery vehicle can be recorded and stored for subsequent review. Various other service enhancements are also available. For example, additional maps with different levels of coverage (e.g. zoom) or features may be optionally requested by the user via the user's touch tone phone.

The present invention is also well suited to generating icons relevant to the end user. That is, the present invention is also well suited to generating an icon of the end user's choice using icon information logic 72 of FIG. 3. Thus, if the user wishes to know the location of an semi-tractor trailer, the icon generated on the display screen can be selected to depict such a vehicle. Such icon selection can be programmed at the user's television interface box 26 using, for example, icon information logic 72 or at the telephone company 20 company. That is, in the present invention, television interface box 26 is programmed to display an icon of a desired design. In the present embodiment, telephone company 20 contains an icon database which allows telephone company 20 to transmit icon information to television interface box 26 thereby directing television interface box 26 to display a desired icon. In either event, well known and readily available technology for generating video overlay is used to accomplish the task.

As yet another advantage, because the present invention utilizes a conventional telephone company, a billing system is already in place. That is, each user can simply be billed on a monthly telephone bill. The amount billed to the user is based, for example, on frequency and duration of use. Also, the present invention only requires a user to operate a telephone and a television. As most consumer's own and are familiar with both a telephone and a television, the present invention eliminates much of the confusion and complexity associated with prior art reporting or tracking systems.

Figure 4:
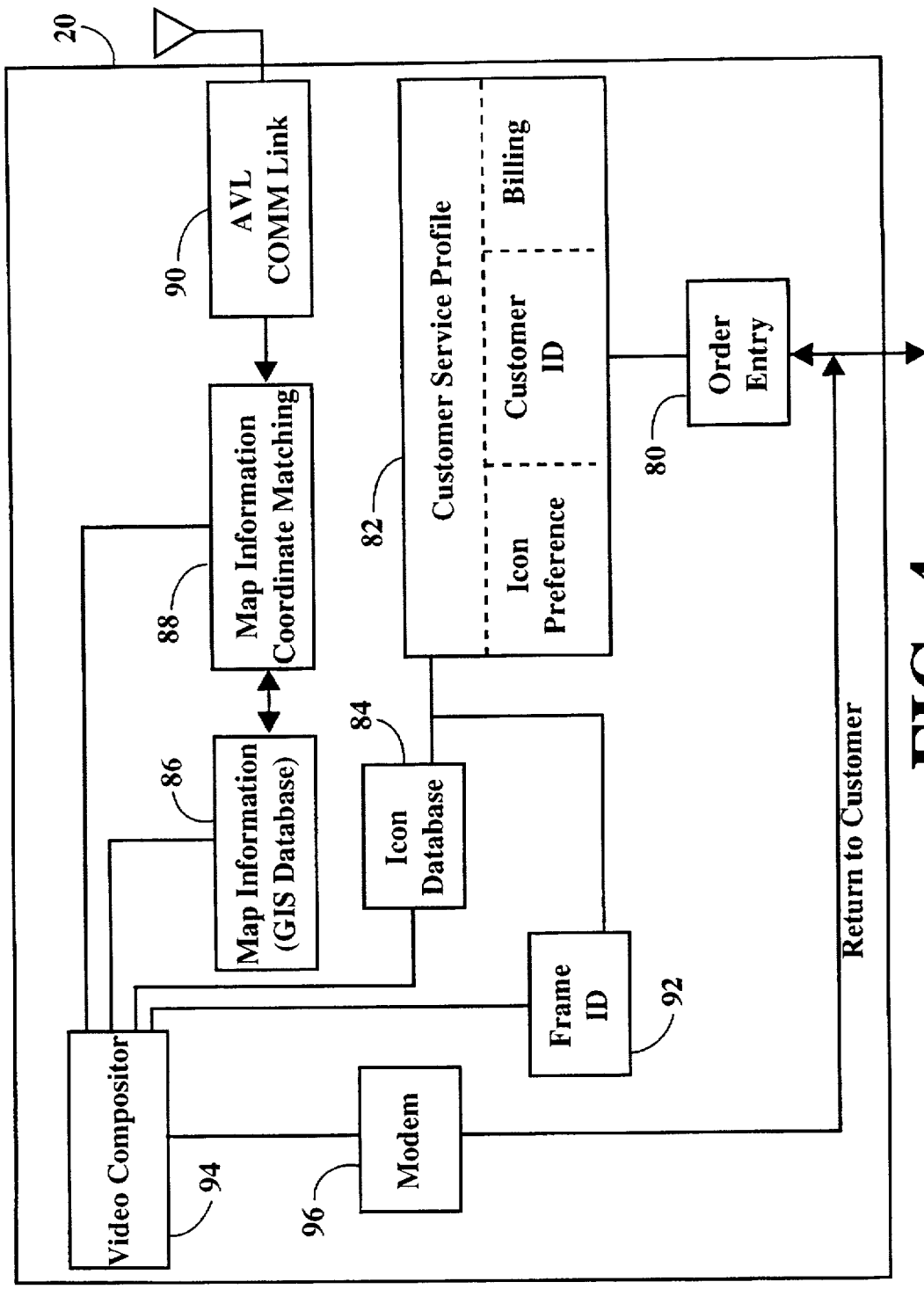
FIG. 4 is a schematic diagram illustrating components present at a service provider in accordance with the present claimed invention.

With reference next to FIG. 4, a schematic diagram illustrating components present at service provider 20 is shown. In the present embodiment, once an order is received at telephone company 20, order entry logic 80 routes the request to a customer service profile database 82. Customer service profile database 82 contains such information as the customer's identification information, customer billing information, and customer icon preferences. The customer icon preferences are used to select the desired icon from icon database 84. In the present embodiment, telephone company 20 contains a map information GIS database 86. Map information coordinate matching component 88 matches the contents of map information GIS database with the position information received at AVL comm link 90. In so doing, map information corresponding to the region in which the monitored item is currently located is sent to the customer. More specifically, the map information is selected such that the icon representing the monitored item is approximately centered with respect to the displayed map information. A frame ID component 92 is also present at telephone company 20. Frame ID component 92 instructs frame grabber 76 of FIG. 3 to grab the appropriate information. Data from frame ID component 92, icon database 84, map information database 86, and map information coordinate matching 88 is input to video compositor component 94. In the present embodiment, the data output from video compositor component 94 is routed through modem 96 and transmitted over a telephone line to the requester. Although such a configuration is used in the present embodiment, the present invention is also well suited to having various other components disposed at telephone company 20. The present invention is also well suited to having the components at telephone company 20 arranged in various other configurations.

Thus, the present invention provides a reporting or tracking system which reduces the number of costly components required to be purchased, a system which does not require the user to master complex and unfamiliar components, and a system which does not require a user to purchase and update at least one GIS database.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A system for visually representing the location of an item, said system comprising:
   a position determining system coupled to an item to be located, said position determining system adapted to transmit position information of said item therefrom;
   a receiver communicatively coupled to said position determining system, said receiver adapted to receive said position information of said item;
   a television adapted to display a visual representation of said position information of said item;
   a telephone company communicatively coupled to said receiver said telephone company adapted to transmit said position information received at said receiver to said television;
   an automatic tracking system communicatively coupled to said telephone company, said automatic tracking system adapted to track said item and provide tracking information on said item to said telephone company, and
   a telephone communicatively coupled to said telephone company, said telephone adapted to request transmission of said position information of said item from said telephone company to said television.

2. The system of claim 1 wherein said position determining system is selected from the class of satellite-based radio navigation systems consisting of the Global Positioning System and the Global Orbiting Navigation System.

3. The system of claim 1 wherein said position determining system is selected from the class of ground-based radio navigation systems consisting of LORAN and FM subcarrier.

4. The system of claim 1 wherein said item to be located is a vehicle.

5. The system of claim 1 wherein said telephone is communicatively coupled to said telephone company by an ISDN link.

6. The system of claim 1 wherein said telephone is communicatively coupled to said telephone company by a dial up telephone line link.

7. The system of claim 1 wherein said telephone is communicatively coupled to said telephone company by a dedicated telephone line link.

8. The system of claim 1 wherein said telephone is communicatively coupled to said telephone company by a fiber optic link.

9. A method for visually representing the location of an item on a display device comprising the steps of:
   requesting, from a telephone company, a visual representation of the location of an item,
   acquiring, at said telephone company, position information indicative of the location of said item,
   converting said position information indicative of the location of said item to be located to a format compatible for transmission to and subsequent display on a television;
   transmitting said acquired position information from said telephone company to said television,
   displaying a visual representation of said position information of said item on said television.

10. The method as recited in claim 9 wherein said step of requesting, from a telephone company, a visual representation of the location of an item further comprises requesting, from a telephone company, a visual representation of the location of a vehicle.

11. The method as recited in claim 9 wherein said step of acquiring, at said telephone company, position information indicative of the location of said item, further includes the step of using a position determining system selected from the class of satellite-based radio navigation systems consisting of the Global Positioning System and the Global Orbiting Navigation System to generate said position information indicative of said location of said item.

12. The method as recited in claim 9 wherein said step of acquiring, at said telephone company, position information indicative of the location of said item, further includes the step of using a position determining system selected from the class of ground-based radio navigation systems consisting of LORAN and FM subcarrier to generate said position information indicative of said location of said item.

13. The method as recited in claim 9 wherein said display device is communicatively coupled to said telephone company by an ISDN link.

14. The method as recited in claim 9 wherein said display device is communicatively coupled to said telephone company by a fiber optic link.

15. A method for visually representing the location of an item on a television comprising the steps of:
   telephonically requesting that a visual representation of the location of an item be transmitted from a telephone company and displayed on a television,
   generating position information indicative of the location of said item,
   receiving said position information at a receiver, said receiver communicatively coupled to said item,
   transmitting said position information from said receiver which is communicatively coupled to said item to said telephone company, said telephone company also communicatively coupled to said receiver,
   converting said position information indicative of the location of said item to a format compatible for transmission to and subsequent display on said television,
   transmitting said acquired position information from said telephone company to said television,
   displaying a visual representation of said position information of said item on said television.

16. The method as recited in claim 15 wherein said step of telephonically requesting that a visual representation of the location of an item be transmitted from a telephone company and displayed on a television further comprises the step of telephonically requesting that a visual representation of the location of a vehicle be transmitted from said telephone company and displayed on said television.

17. The method as recited in claim 15 wherein said step of generating position information indicative of the location f said item further comprises the step of generating said position information using a position determining system selected from the class of satellite-based radio navigation systems consisting of the Global Positioning System and the Global Orbiting Navigation System.

18. The method as recited in claim 15 wherein said step of generating position information indicative of the location of said item further comprises the step of generating said position information using a position determining system selected from the class of ground-based radio navigation systems consisting of LORAN and FM subcarrier.

* * * * *